United States Patent
Li et al.

(10) Patent No.: US 8,146,093 B2
(45) Date of Patent: Mar. 27, 2012

(54) COMPUTER MULTIPLE OPERATION SYSTEM SWITCHING METHOD

(75) Inventors: Zhongqing Li, Beijing (CN); Liang Tang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 962 days.

(21) Appl. No.: 11/793,463

(22) PCT Filed: Jul. 11, 2005

(86) PCT No.: PCT/CN2005/001018
§ 371 (c)(1),
(2), (4) Date: Jan. 8, 2008

(87) PCT Pub. No.: WO2006/066473
PCT Pub. Date: Jun. 29, 2006

(65) Prior Publication Data
US 2008/0162901 A1    Jul. 3, 2008

(30) Foreign Application Priority Data
Dec. 24, 2004    (CN) .......................... 2004 1 0102855

(51) Int. Cl.
*G06F 9/46* (2006.01)
*G06F 15/76* (2006.01)
*G06F 7/38* (2006.01)
*G06F 9/00* (2006.01)

(52) U.S. Cl. ............... 718/106; 712/43; 712/228; 713/2

(58) Field of Classification Search ........................ None
See application file for complete search history.

(56) References Cited

U.S. PATENT DOCUMENTS

| 4,493,034 A | * | 1/1985 | Angelle et al. | ................. 713/100 |
| 2001/0018717 A1 | * | 8/2001 | Shimotono | .................... 709/319 |
| 2002/0038328 A1 | * | 3/2002 | Morisawa | .......................... 709/1 |

FOREIGN PATENT DOCUMENTS

| CN | 1512337 | 7/2004 |
| CN | 1512337 A | 7/2004 |
| CN | 1 609 825 A | 4/2005 |

OTHER PUBLICATIONS

Copy of Chinese Office Action from CN 2004101028551, dated Nov. 24, 2006, 4 pgs.

* cited by examiner

*Primary Examiner* — Camquy Truong
(74) *Attorney, Agent, or Firm* — Westman, Champlin & Kelly, P.A.

(57) ABSTRACT

A computer multi-OS switching method, in which a data exchange region for storing OS running environment information is provided, wherein the method includes: A. saving running information of computer hardware devices in a random access memory (RAM) by the computer after receiving a command for switching OS; B. obtaining OS running environment information of OS to be switched to from the data exchange region and storing the obtained OS running environment information in the RAM by the computer; C. restoring running state of the computer hardware devices based on its running information stored in the RAM, obtaining a preset OS to be switched to, starting the OS and subsequently executing the OS running environment information in the RAM by the computer. The method reduces the time for switching between multi-OSs in a computer.

4 Claims, 2 Drawing Sheets

COMPUTER MULTIPLE OPERATION SYSTEM SWITCHING METHOD

CROSS-REFERENCE TO RELATED APPLICATION

This application is a Section 371 National Stage Application of International Application No. PCT/CN2005/001018, filed Jul. 11, 2005 and published as WO 2006/066473 on Jun. 29, 2006, not in English, the contents of which is hereby incorporated by reference in its entirety.

BACKGROUND OF THE INVENTION

1. Field of Invention

The present invention relates to the field of computer multi-OS (Multiple Operating System) technology, in particular to a computer multi-OS switching method.

2. Description of Prior Art

Along with the advance of computer technology, it is now possible to achieve multi-function applications, such as application for simultaneously implementing an OS of household appliance mode and an OS of computer mode, in a computer by loading multi-OSs into the computer. With the computer multi-OS application popularized, the requirement on the time needed for switching between multi-OSs in the computer becomes more and more stricter. However, the switching of time of existing multi-OSs computer cannot meet such requirement.

The switching process between OSs in a computer actually comprises turning off one of the OSs, restarting the basic input/output system (BIOS) and then entering another OS. FIG. 1 shows the switching process between multi-OSs in a computer, which has the following specific steps assuming that two OSs are OS-1 and OS-2, respectively.

In step 100-101, the computer is powered on, BIOS initializes hardware devices in the computer and detects hard disk, and then BIOS judges the location of OS-1 (or OS-2) in the hard disk and acquires OS-1 (or OS-2);

In step 102, OS-1 (or OS-2) reads file data associated with itself from the hard disk to a random access memory (RAM), detects the hard disk and starts up;

In step 103, OS-1 (or OS-2) is turned off;

In step 104, the computer is reset, and BIOS once more initializes hardware devices in the computer, detects hard disk, and then judges the location of OS-2 (or OS-1) in the hard disk and acquires OS-2 (or OS-1);

In step 105, OS-2 (or OS-1) reads file data associated with itself from the hard disk to the RAM, detects the hard disk and starts up;

In step 106, the switching between the two Operating Systems is completed.

If there are three or more OSs to be switched, it is necessary to provide a user with a step for selecting which OS to be started or a step for alternately selecting an OS before the step 104 such that the computer is informed of the OS to be switched to and then executes the steps 104-106 to complete the OS switching process.

Since the switching process between multi-OSs in a computer is equivalent to the restart of the computer, the switching time for multi-OSs equals to the sum of time for restarting the computer twice. This leads to an excessive long switching period between multi-OSs in the computer, the period during switching the computer OSs equals to the sum of the two restarting period of the computer. Further, due to the same reason that the switching process between multi-OSs in a computer is equivalent to a restart of the computer, the user cannot save any running environment information (CONTEXT) in the OS before switching operation, and hence the user cannot continue his or her operation based on any saved CONTEXT when switching to the OS again.

At present, there is another method for computer multi-OS switching, in which the running environment of present computer OS is first suspended to a hard disk (STD) so as to put the OS into a sleeping state. At the time of switching back to the OS, the computer is reset. BIOS initializes hard devices in the computer, detects the hard disk, obtains the OS from the hard disk and copies its running environment into a RAM. The OS is restarted from the RAM based on the OS and its running environment. This method, however, also requires BIOS of the computer to initialize the hard devices and detect the hard disk, thus the time for switch OS is relatively long.

SUMMARY OF THE INVENTION

In view of the above problems, the primary object of the invention is to provide a computer multi-OS switching method capable of reducing the time for computer multi-OS switching.

According to the above object, the technical solution of the invention is realized as follows.

A computer multi-OS switching method, in which a data exchange region for storing OS running environment information is provided, wherein A. the computer saves running information of computer hardware devices in a random access memory (RAM) after receiving a command for switching OS;

B. the computer obtains OS running environment information of OS to be switched to from the data exchange region and stores the obtained OS running environment information in the RAM;

C. the computer restores running state of the computer hardware devices based on its running information stored in the RAM, obtains a preset OS to be switched to, starts the OS and subsequently executes the OS running environment information in the RAM.

One or more said data exchange regions are provided and configured to store OS running environment information of different OSs, respectively.

Said data exchange region is configured to store OS running environment information in the following manner:

a. the computer stores the OS running environment information of the executed OS in the RAM;

b. the computer stores the OS running environment information in the RAM into the data exchange region corresponding to the OS executed by the computer.

Before said step B of obtaining OS running environment information of OS to be switched to from the data exchange region, the method further comprises:

B1. judging, by the computer whether there is OS running environment information of OS to be switched to stored in the data exchange region and continuing to perform step B if yes; otherwise, obtaining the preset OS to be switched to from the hard disk by the computer, wherein the basic input/output system BIOS of the computer initializes the computer hardware devices, detects the hard disk and then executes the obtained OS, and the OS is started after the detection of the hard disk.

Said process of step B is performed by BIOS of the computer.

Said process of step A is performed by the OS currently executed by the computer.

Said process of step B is performed by BIOS of the computer.

Said process of step C is performed by BIOS of the computer.

Said data exchange region is set in the RAM or a nonvolatile memory.

As mentioned in the above solution, in the method according to the invention, one or more data exchange regions are provided in RAM or a nonvolatile memory, each of the data exchange regions is configured to store running environment information (CONTEXT) of one computer OS. When an OS switching is to be performed in the computer, the computer first enters a switching state, that is, the computer stores running information of all computer hardware devices in the RAM. Then, the OS to be switched to is obtained from the hard disk, and the CONTEXT of the OS to be switched to is copied from the data exchange region to the RAM. Finally, the computer returns from the switching state, that is, the computer hardware devices return and enter the running state before the switching state, and the OS to be switched to is executed on the RAM based on the OS to be switched to and its CONTEXT. According to the present invention, there is no need for initialization of hardware devices, such as CPU, RAM, computer chip and hard disk, by BIOS or detection of hard disk by BIOS and OS to be switched to, the time for computer OS switching is consequently reduced. Further, since CONTEXT for each computer OS has been saved in the data exchange region in the present invention, the user is enabled to continue his or her operation based on the saved CONTEXT when switching back to the original OS.

Therefore, the method according to the present invention reduces the time for switching between multi-OSs in a computer and accelerates a computer multi-OS switching process.

DETAILED DESCRIPTION OF PREFERRED EMBODIMENTS

The object, technical solution and advantages of the present invention will be better understood from the following detailed description by way of embodiments with reference to the figures.

Figure 1:
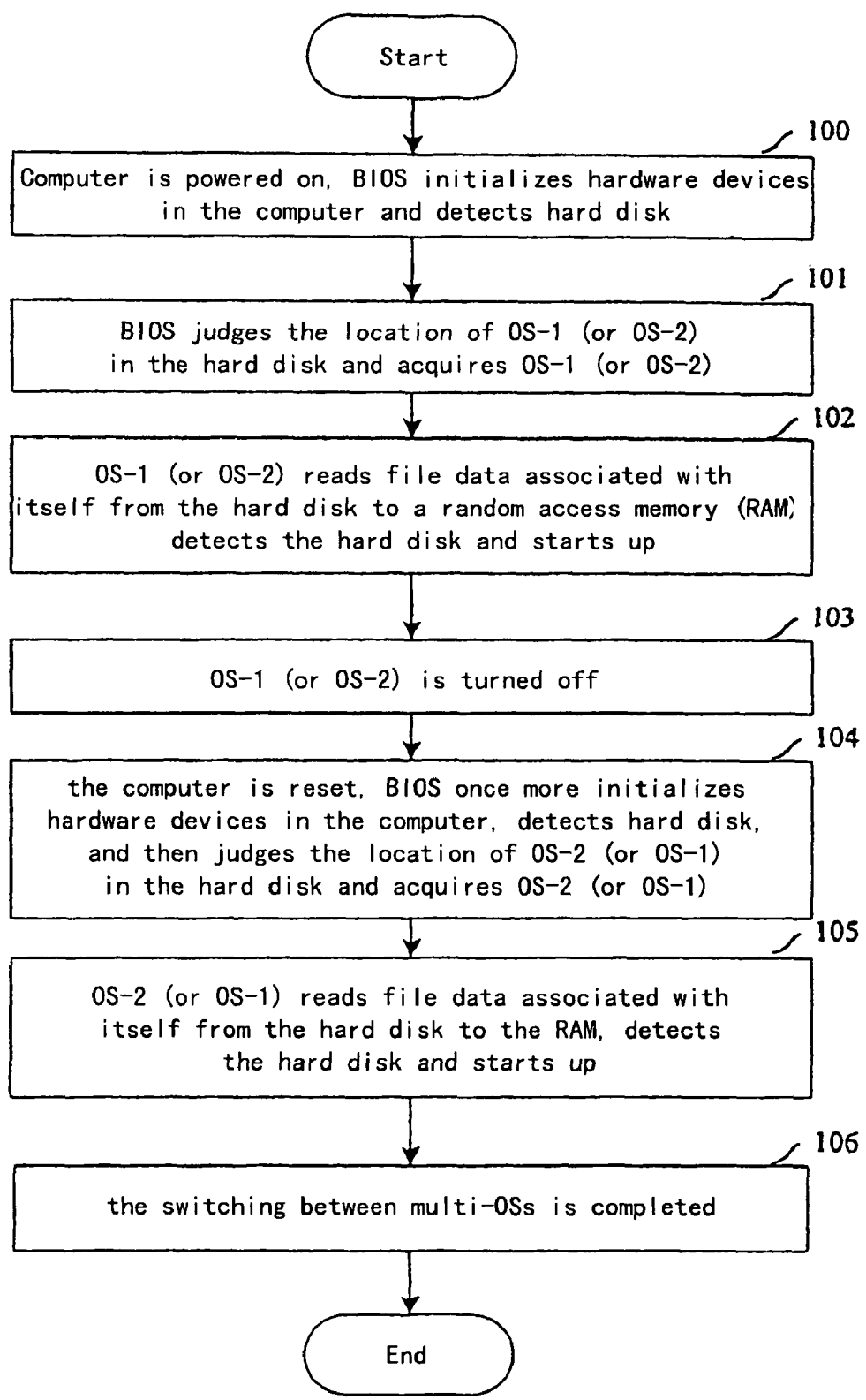
FIG. 1 is a flowchart for computer multi-OS switching process in the prior art.
Figure 2:
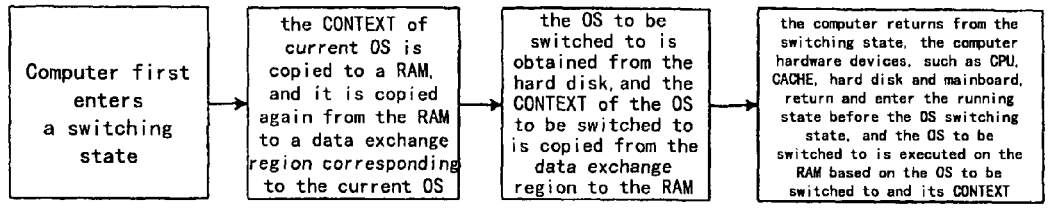
FIG. 2 is a schematic diagram for computer OS switching process according to the present invention.

In the method provided by the invention, one or more data exchange regions are provided in RAM or a nonvolatile memory, for example, in hard disk or a plug-in memory. These data exchange regions can be provided in one memory or several memories of different types. Each of the data exchange regions is used to store CONTEXT for one computer OS. FIG. 2 is a schematic diagram for computer OS switching process according to the present invention. As shown in the figure, when an OS switching is to be performed in a computer, the computer first enters a switching state. Then the CONTEXT of current OS is copied to the RAM, and it is copied again from the RAM to a data exchange region corresponding to the current OS. Then, the OS to be switched to is obtained from the hard disk, and the CONTEXT of the OS to be switched to is copied to the RAM from the data exchange region corresponding to the current OS. Finally, the computer returns from the switching state, i.e., the computer hardware devices, such as CPU, CACHE, hard disk and mainboard, return and enter the running state before the switching state of the OS. The OS to be switched to is executed on the RAM based on the OS to be switched to and its CONTEXT. Thus the switching of computer OSs is completed.

Figure 3:
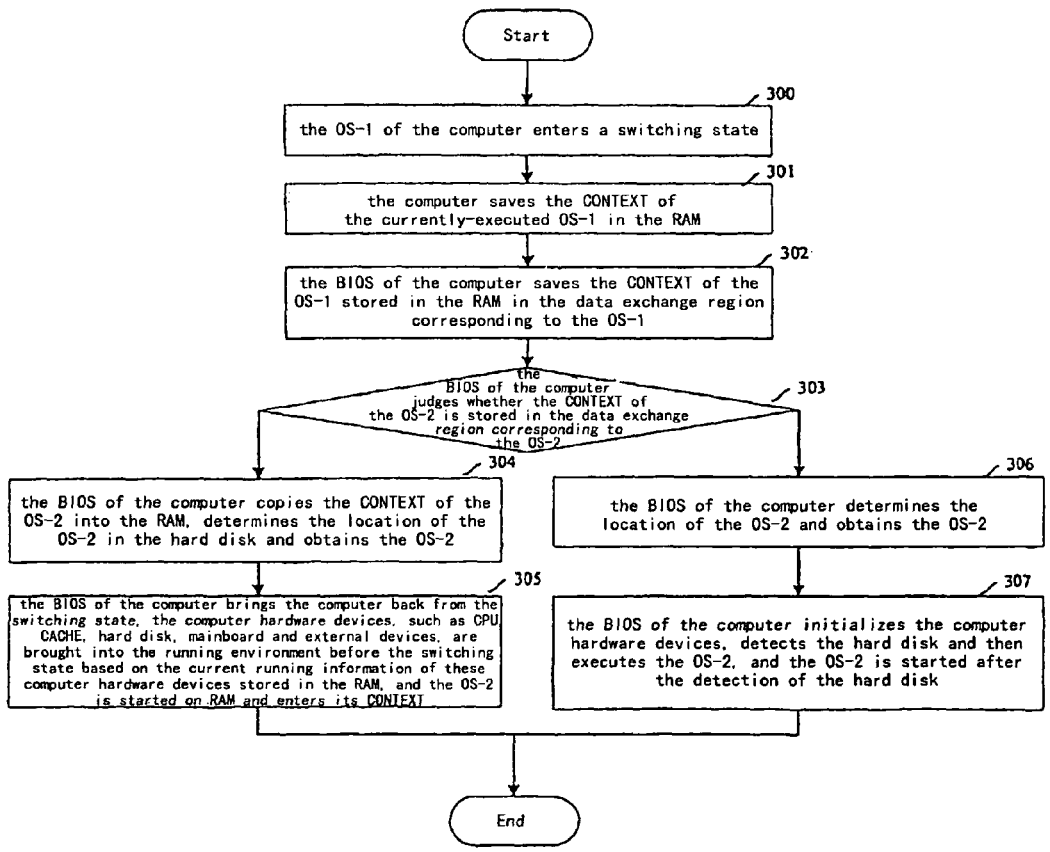
FIG. 3 is a flowchart for switching between multi-OSs in a computer according to the present invention.

FIG. 3 is a flowchart of switching between multi-OSs in a computer according to the present invention, which includes the following specific steps assuming that the switching is from an OS-1 to another OS-2.

In step 300, after the computer receives a command for switching OS, the OS-1 of the computer enters a switching state.

The process of entering a switching state is that the OS-1 stores current running information of computer hardware devices, such as CPU, CACHE, hard disk, mainboard and external devices, in the RAM.

When the computer returns from the switching state, since the current running information of computer hardware devices, such as CPU, CACHE, hard disk, mainboard and external devices, has been stored in the RAM, these computer hardware devices, such as CPU, CACHE, hard disk, mainboard and external devices, can run directly based on the running information obtained from the RAM. So it is unnecessary to initialize these computer hardware devices, such as CPU, CACHE, hard disk, mainboard and external devices, or detect hard disk again, thereby reducing the time needed for initialization.

In step 301, the computer saves the CONTEXT of the currently-executed OS-1 in the RAM. This step is fulfilled by the currently-executed OS-1.

In step 302, the BIOS of the computer saves the CONTEXT of the OS-1 stored in the RAM in the data exchange region corresponding to the OS-1.

In step 303, the BIOS of the computer judges whether the CONTEXT of the OS-2 is stored in the data exchange region corresponding to the OS-2 and performs step 304 if yes; otherwise, step 306 is performed.

In step 304, the BIOS of the computer copies the CONTEXT of the OS-2 into the RAM, determines the location of the OS-2 in the hard disk and obtains the OS-2.

In step 305, the BIOS of the computer brings the computer back from the switching state, and the computer hardware devices, such as CPU, CACHE, hard disk, mainboard and external devices, are brought into the running environment before the switching state based on the current running information of these computer hardware devices stored in the RAM. The OS-2 is started on RAM and the CONTEXT of the OS-2 is executed;

In step 306, the BIOS of the computer determines the location of the OS-2 and obtains the OS-2.

If the OS-2 is started for the first time, the CONTEXT of the OS-2 hasn't saved in the data exchange region corresponding to the OS-2, and hence the BIOS of the computer will obtain the OS-2 directly from the hard disk.

In step 307, as described in the prior art, the BIOS of the computer initializes the computer hardware devices, detects the hard disk and then executes the OS-2 on the RAM, and the OS-2 is started after the detection of the hard disk.

If the BIOS of the computer supports the computer's return from the switching state, the process of step 307 can be such that the BIOS of the computer brings the computer back from the switching state, the computer hardware devices, such as CPU, CACHE, hard disk, mainboard and external devices, are brought into the running environment before the switching state based on the current running information of these computer hardware devices stored in the RAM, and the OS-2 in the RAM is started after detection of the hard disk.

To implement the method according to the present invention, in the underlying software, i.e., BIOS, of the computer, OS selection and control function is provided, which can determine the OS to be switched to based on the received command for switching OS, perform the flow shown in FIG. 3 and fulfill the switching of OS in the computer.

FIG. 3 illustrates the process for switching between two OSs. When more than two OSs are preset in a computer, and the computer is to be switched from the currently-running OS to a user-desired OS, the overall process is the same as that of FIG. 3 except that the command for switching OS received by the computer contains the name of the OS to be switched to, from which the computer determines which OS is to be switched to.

Since the computer in the present invention generally is installed a plurality of OSs, when the computer is powered on and starts for the first time, main boot record (MBR) can be utilized to select an OS as the current OS to be started, as known in the prior art.

The following illustrates the present invention by way of a specific example.

It is assumed that the computer is a personal computer (PC) in which two OSs are installed, such as WINDOWS XP and WINDOWS 98. Operating System WINDOWS XP is for a user's work and Operating System WINDOWS 98 is for his or her entertainment.

According to the present invention, data exchange regions are provided for the two OS and configured to store CONTEXT of the two OS, respectively. Consider that, upon the start of the PC, it enters Operating System WINDOWS 98 by MBR to execute a game software. Then, the PC receives the command for switching to Operating System WINDOWS XP and executes the switching process. The computer first enters the switching state, then the CONTEXT of current OS, Operating System WINDOWS 98, is saved in the RAM, that is to say, the game environment in Operating System WINDOWS 98 is saved. Next, the game environment in Operating System WINDOWS 98 saved in the RAM is saved in the data exchange region corresponding to Operating System WINDOWS 98, and Operating System WINDOWS XP is obtained. Finally, the BIOS of the computer initializes the computer hardware devices, detects the hard disk and then executes Operating System WINDOWS XP in the RAM, and WINDOWS XP is started after initializing the computer hardware devices and detecting the hard disk.

Upon the reception of the command for switching to Operating System WINDOWS 98, the computer executes the switching process. The computer first enters the switching state, then the CONTEXT of current OS, WINDOWS XP, is saved in the RAM, that is to say, the work environment in Operating System WINDOWS XP is saved. Next, the work environment in Operating System WINDOWS XP saved in the RAM is saved in the data exchange region corresponding to Operating System WINDOWS XP. Following the obtaining of Operating System WINDOWS 98, the CONTEXT of Operating System WINDOWS 98, i.e., the game environment in WINDOWS 98, is obtained from the data exchange region corresponding to Operating System WINDOWS 98 and stored in the RAM. Finally, the computer returns from the switching state, starts Operating System WINDOWS 98 in the RAM and executes the game environment in Operating System WINDOWS 98. In this way, the user can continue his or her game in the game environment in Operating System WINDOWS 98 before the above switching process.

In conclusion, the method according to the present invention is advantageous in that it is so simple that there is no need to make any change in the existing computer OS. The OS switching takes less time and doesn't involve restart of computer OS. It is easy, stable, reliable and cost-saving; and it enables all OS CONTEXT to be saved.

The above only discloses the preferred embodiment of the present invention and has no intention to limit the present invention. Therefore, any modification, substitution and change made within the spirit and principle of the present invention should be contained in the scope of the invention.

What is claimed is:

1. A switching method for a computer having at least a first and a second operating systems (OSs), in the computer a first data exchange region is provided for storing the running environment information of the first OS, and a second data exchange region is provided for storing the running environment information of the second OS, wherein the method comprises:

A. saving a current running state information of computer hardware devices and the current running environment information of the first OS in a random access memory (RAM) after receiving a command for switching from the currently operated first OS to the second OS;

B. copying the current running environment information of the first OS saved in the RAM to the first data exchange region, and copying the running environment information of the second OS previously stored in the second data exchange region to the RAM; and C. restoring the current running state information of the computer hardware devices based on the current running information saved in the RAM, and starting the second OS based on the running environment information of the second OS copied to the RAM and the state of the computer hardware devices;

wherein before copying the running environment information of the second OS previously stored in the second data exchange region to the RAM in the step B the method further comprises:

B 1. Judging by a basic input/output system (BIOS), whether there is running environment information of the second OS stored in the second data exchange region, and if there is, copying the running environment information to the RAM, while if there is not, the second OS is started for the first time, obtaining preset running environment information for the second OS from the hard disk, wherein the BIOS initializes the computer hardware devices, detects the hard disk and then start the second OS with the obtained running environment information, and the second OS is started after detection of the hard disk;

wherein said process of step B is performed by the BIOS of the computer, and said process of step C is performed by the BIOS of the computer.

2. The method according to claim 1, wherein the running environment information of the second OS was previously stored in the second data exchange region when the second OS was the currently operated OS by:

a. storing the running environment information of the second OS in the RAM; and b. copying the running environment information of the second OS in the RAM into the second data exchange region.

3. The method according to claim 1, wherein said process of step B 1 is performed by the BIOS of the computer.

4. The method according to claim 1, wherein said first and second data exchange regions are set in the RAM or a non-volatile memory.

* * * * *